J. P. FREEMAN.
BACK BAND HOOK AND CLAMP.
APPLICATION FILED SEPT. 3, 1909.
947,017.
Patented Jan. 18, 1910.
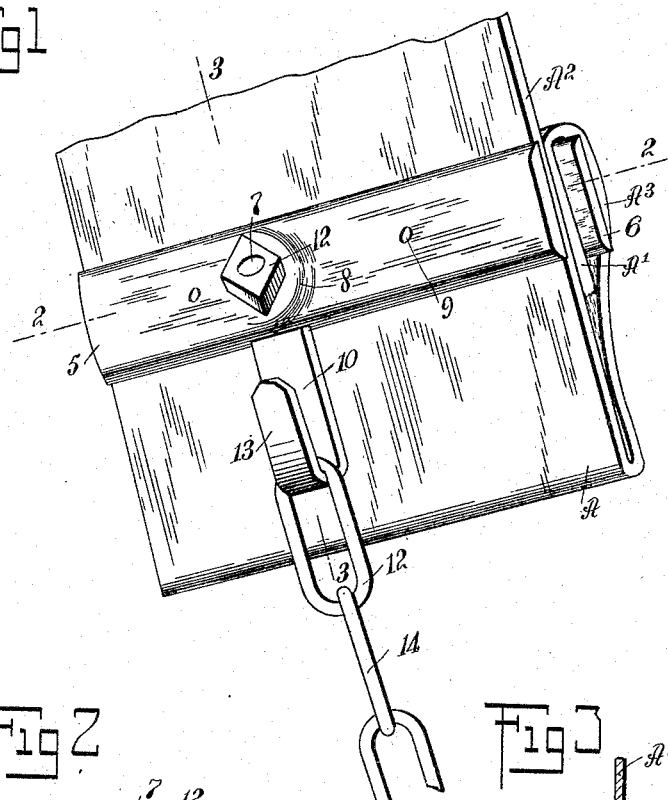
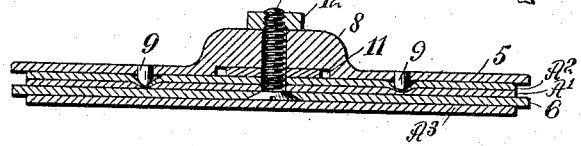
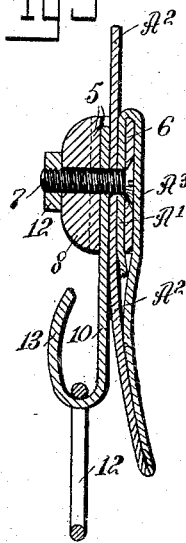
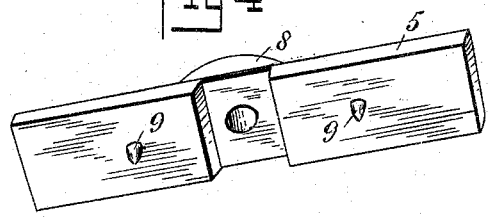
WITNESSES
C.J. Hachenberg.
E.F. Murdock
INVENTOR
Josiah P. Freeman
BY
Munn & Co
ATTORNEYS

UNITED STATES PATENT OFFICE.

JOSIAH P. FREEMAN, OF SOCIAL CIRCLE, GEORGIA.

BACK-BAND HOOK AND CLAMP.

947,017.  Specification of Letters Patent.  Patented Jan. 18, 1910.

Application filed September 3, 1909. Serial No. 516,012.

*To all whom it may concern:*

Be it known that I, JOSIAH P. FREEMAN, a citizen of the United States, and a resident of Social Circle, in the county of Walton and State of Georgia, have invented a new and Improved Back-Band Hook and Clamp, of which the following is a full, clear, and exact description.

Among the principal objects which the present invention has in view are: to provide a clamping device to take up or to splice a flexible member of harness for attachment of the same to a chain; and to provide an implement of the character specified which is simple, economical and durable.

One embodiment of the present invention is disclosed in the structure illustrated in the accompanying drawings, in which like characters of reference denote corresponding parts in all the views, and in which—

Figure 1 is a perspective view of a clamp and hook constructed in accordance with this invention, shown in its application to a flexible band and connected chain; Fig. 2 is a longitudinal section taken on the line 2—2 in Fig. 1; Fig. 3 is a cross section taken on the line 3—3 in Fig. 1; and Fig. 4 is a perspective view, shown from beneath, of the upper bar forming the clamp in the present invention.

The clamping bars 5 and 6 are connected and held together by a screw threaded bolt 7. The bolt 7 passes through a smooth perforation in a boss 8 raised on the upper surface of the upper clamp bar 5. The bolt 7 passes through a smooth perforation in the clamp bar 6 wherein the head of the bolt is counter-sunk to form a flush outer surface on the said bar 6. The bar 5 is provided at suitable intervals with dull pointed spurs 9, 9, which are adapted to bed into the pliable material interposed between the bars 5 and 6.

A flat hook 10 is inserted in a recess 11 formed in the bar 5. A perforation is formed in the hook 10 to pass the bolt 7, shown in Fig. 2 of the drawings. The bolt 7 is further provided with a screw nut 12, arranged substantially as shown in Figs. 2 and 3 of the drawings. The return end 13 of the hook 10 is formed to lie as close to the body of the hook as possible. In operation, the links of the chain 14 are placed in the hook 10, lengthening or shortening the chain, as the case may be.

Having a clamp of the character described, the operation is as follows: The back band A is formed of any suitable pliable material. In the extreme end $A^1$ is formed a perforation to pass the bolt 7. The bolt 7 being extended through the bar 6, the said bolt is extended through the perforation in the end $A^1$. The body portion $A^2$ of the band A, at the desired location, is provided with a perforation similar to that formed in the end $A^1$, and the bolt 7 is threaded through this perforation. The hook 10 is then threaded upon the bolt 7, to be immediately followed by the bar 5, the said bar 5 resting across the upper face of the body portion $A^2$ of the band A. In this position the nut 12 is screwed upon the bolt 7. The nut 12 is then screwed firmly down upon the boss 8, forcing the bars 5 and 6 together, and jamming the spurs 9, 9 into the material forming the band A, and clamped between the two bars 5 and 6. This grip on the material maintains the clamp in position.

By passing the band end $A^1$ over the bar 6, as illustrated in Fig. 1 of the drawings, the bar is held out of contact with the skin of the animal by the interposed portion $A^3$ of the said band.

It will be seen that the appliance herein described and illustrated is simple and of trifling cost. It will also be seen that it is a connector which may be quickly and readily applied under all conditions of breakage.

Having thus described my invention, what I claim as new and desire to secure by Letters Patent is:—

1. A back band hook and clamp comprising a bar adapted to be infolded by a back band and having a screw threaded bolt set flush on the back of the said bar and extended from near the center thereof; a second bar overlaid on the first mentioned bar and having extended from the juxtaposed surface a plurality of spurs extending into layers of said band when infolding the said first mentioned bar; a flattened bar hook the shank whereof is perforated to receive said bolt; and a screw threaded nut to draw the said bars together.

2. A back band hook and clamp comprising a bar adapted to be infolded by a back band and having a screw threaded bolt set flush on the back of the said bar and extended from near the center thereof; a second bar overlaid on the first mentioned bar and having protruded from the juxtaposed surface a plurality of spurs extending into the layers of said band when infolding said first mentioned bar, said second bar having an arched recess in its under surface and a superimposed boss extended from its upper surface arranged to stiffen the structure of said second bar; a hook having a shank shaped to snugly fit the said recess to be held fixedly thereby, said shank being perforated to pass said bolt; and a screw threaded nut adapted to engage said bolt in threaded relation thereto and to seat upon the said boss to draw the said bars together.

In testimony whereof I have signed my name to this specification in the presence of two subscribing witnesses.

JOSIAH P. FREEMAN.

Witnesses:
    GEO. T. SPEARMAN,
    P. B. KNOX.